(12) United States Patent
Prabhu et al.

(10) Patent No.: US 7,155,728 B1
(45) Date of Patent: Dec. 26, 2006

(54) REMOTING FEATURES

(75) Inventors: Manish S. Prabhu, Redmond, WA (US); Caleb L. Doise, Bellevue, WA (US); Tarun Anand, Bellevue, WA (US); Stephen Peter de Jong, Bellevue, WA (US); Jonathan C. Hawkins, Seattle, WA (US); Gopala Krishna R. Kakivaya, Sammamish, WA (US); Matthew R. Smith, Layton, UT (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 09/893,943

(22) Filed: Jun. 28, 2001

(51) Int. Cl.
*G06F 13/00* (2006.01)

(52) U.S. Cl. ............ 719/316; 719/310; 719/315; 719/330

(58) Field of Classification Search ........... 719/316, 719/315, 310, 330
See application file for complete search history.

(56) References Cited

U.S. PATENT DOCUMENTS

| | | | |
|---|---|---|---|
| 6,014,700 A * | 1/2000 | Bainbridge et al. | 709/226 |
| 6,253,253 B1 | 6/2001 | Mason et al. | |
| 6,449,648 B1 * | 9/2002 | Waldo et al. | 709/226 |
| 6,487,590 B1 * | 11/2002 | Foley et al. | 709/223 |
| 6,640,249 B1 * | 10/2003 | Bowman-Amuah | 709/228 |
| 6,658,573 B1 * | 12/2003 | Bischof et al. | 726/16 |
| 6,681,263 B1 * | 1/2004 | King | 719/315 |
| 6,883,172 B1 * | 4/2005 | Angeline et al. | 719/315 |

OTHER PUBLICATIONS

Baldonado, et al., "Metadata for Digital Libraries; Architecture and Design Rationale," Jul. 1997.

Hicks, et al., "Transparent Communication for Distributed Objects in Java," JAVA '99, p. 160-70, 1999.

Piet Obermeyer, et al., Microsoft .NET Remoting: A Technical Overview, Microsoft Corporation, Nov. 2000, 10 pages.

* cited by examiner

*Primary Examiner*—William Thomson
*Assistant Examiner*—Andy Ho
(74) *Attorney, Agent, or Firm*—Amin, Turocy & Calvin, LLP

(57) ABSTRACT

A system and method that provides remoting services in a distributed object system is provided. The system includes a remote object monitor and a remote object manipulator. The remote object monitor can provide a human readable reference to a remote object, where the human readable reference is a URL (Uniform Resource Locator) and can include protocol information, protocol data, an application name and an object URI (Uniform Resource Identifier). The remote object monitor can also provide metadata concerning a remote object, where the metadata can include information concerning interfaces implemented by a remote object, the type of a remote object, the class hierarchy of a remote object, methods implemented by a remote object, properties implemented by a remote object and attributes implemented by a remote object. The remote object monitor can also provide entry points and code interception for custom attribute based activation processing that can be performed before, after and/or substantially in parallel with non-attribute code associated with a remote object. The remote object monitor can also monitor and/or control the lifetime of a remote object, using, for example, a lease manager. The remote object manipulator can also update metadata concerning a remote object and can control the lifetime of a remote object via a lease manager, for example.

11 Claims, 17 Drawing Sheets

REMOTING FEATURES

TECHNICAL FIELD

The present invention relates generally to distributed objects systems that support remote method calling and more particularly to providing remoting features including human readable remote object references, user accessible object metadata, subclassable object references, custom attribute based activation/interception and lifetime services for remote objects.

BACKGROUND OF THE INVENTION

Conventional distributed object systems include a notion of a remote object, and a reference to the remote object. But conventional distributed objects systems have typically employed computer generated and/or computer readable references to remote objects, which complicates, sometimes to the point of impossibility, human understanding of the object reference. Thus it has conventionally been difficult to monitor, analyze, understand and/or debug applications that employ such computer generated and/or readable references.

Conventional distributed object systems may generate, store and/or manipulate data concerning methods, fields and interfaces associated with remote objects and their references. Such data about data (metadata) has historically either not been available to users of the distributed object system and/or accessors of remote objects or, if available, has been difficult to acquire and/or understand. Thus, information concerning, for example, interfaces associated with a remote object, has typically not been examined by users of distributed objects systems and/or accessors of remote objects and thus opportunities for greater understanding and simpler management of such systems and objects may have been missed. For example, without access to remote object metadata it may be impossible to refine a proxy based on such remote information.

Similarly, the absence of information concerning remote objects has complicated, sometimes to the point of impossibility, the task of adapting and/or extending a remote object on a client. Thus, opportunities to customize objects and/or to add client side extensions to server side remote objects may have been missed.

A remote object and/or a proxy that are created and/or managed by a conventional distributed object system may have their lifetime controlled by the system. But, in the absence of information concerning access to such objects and/or proxies, and in the absence of metadata associated with such objects and/or proxies, efficiently controlling the lifetime of a remote object and/or its proxy may be complicated, with resulting undesirable results (e.g., memory leaks, objects consuming resources although there are no references to the object, etc.).

Thus, there remains a need for a distributed object system that offers features that mitigate problems associated with unreadable, unextendable remote objects whose lifetimes are inadequately monitored and/or controlled.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to remoting features including human readable remote object references, user accessible object metadata, subclassable object references, custom attribute based activation/interception and lifetime services for remote objects. The present invention provides a framework that allows objects to interact with one another across logical and/or physical boundaries (e.g., application domains) with more open and more sophisticated features than provided in conventional systems. Thus, the framework provides a number of additional remoting services.

One objective of a remoting framework is to provide the necessary infrastructure that hides the complexities of calling methods on remote objects and returning results. However, another objective of a remoting framework is to provide an open, user accessible, user programmable, user extendable infrastructure that can be employed to provide sophisticated remoting services. Thus, the present invention facilitates providing a remoting service that makes object references human readable. One of the features of the present invention is providing a remoting service that facilitates considering an object to be a URL (Uniform Resource Locator). Treating a remote object as a URL facilitates producing an object reference coded in a human readable form (e.g., a URL). For example, the URL http://www.gopal.com/401k/balance.htm can be employed as one example human readable object reference.

By employing the present invention, a client that has acquired a proxy to a remote object can employ remoting services to acquire metadata concerning the object to which the proxy refers. By way of illustration, the proxy may be employed to inquire about interfaces implemented by the remote object. By way of further illustration, the proxy may be employed to inquire about the type of the remote object. With such information, the client may then be able to extend the object reference, which facilitates refining the proxy.

Thus, the present invention further provides an object reference base class that provides a base set of object reference functionality. The present invention facilitates creating derived object reference classes that inherit from the object reference base class, and which can override the base set of object reference functionality and/or add additional functionality to the object reference class, where such inheritance and extensibility is made easier by the availability and accessibility of metadata concerning instances of such an object reference base class.

The present invention further facilitates custom attribute based activation via interception and facilitates managing the lifetime of a remote object. Thus, opportunities are provided to object users to customize the behavior of an object without changing the code located inside the object. Furthermore, complexity associated with garbage collection is moved from the set of problems with which a programmer must deal to the remoting services set of concerns, providing an easier to use, more memory efficient distributed object environment.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
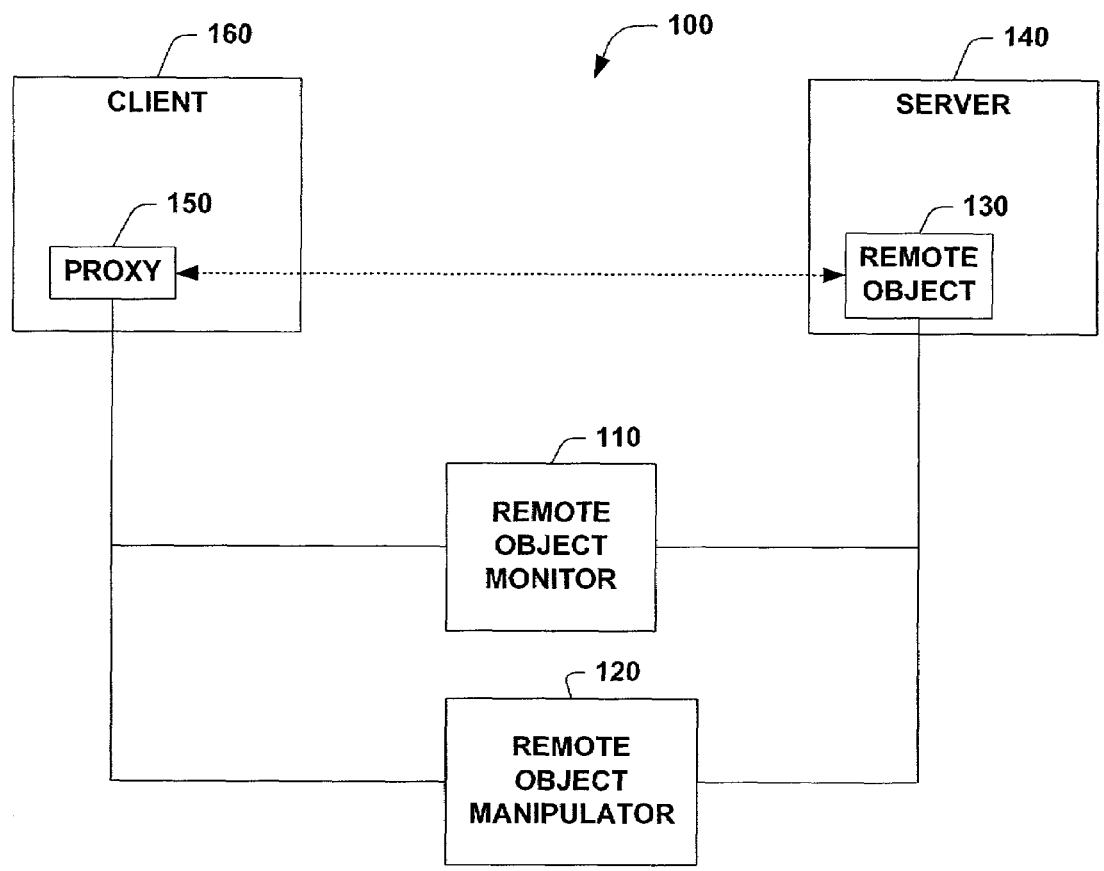
FIG. 1 is a schematic block diagram illustrating a system that facilitates providing improved, open remoting services, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Concerning interfaces, classes not related by inheritance may, nevertheless, share common functionality. For example, many classes may contain methods for saving their state to and from permanent storage. For this purpose, classes not related by inheritance may support interfaces allowing programmers to code for the classes' shared behavior based on their shared interface type and not their exact types. Thus, as used in this application, the term "interface" refers to a partial specification of a type. It is a contract that binds implementers to provide implementations of the methods contained in the interface. Object types may support many interface types, and many different object types would normally support an interface type. By definition, an interface type can never be an object type or an event type. Interfaces may extend other interface types. Thus, an interface may contain, for example, methods (both class and instance), static fields, properties and events. However, unlike an object, an interface cannot obtain instance fields.

Concerning proxies and object references, proxy objects are created when a client activates a remote object. The proxy object acts as a representative of the remote objects and ensures that calls made on the proxy are forwarded to the correct remote object instance. Proxy objects interact with an object reference (e.g., ObjRef). A remote object is registered in an application domain on a remote machine. The object is marshaled to produce an object reference. The object reference contains information required to locate and access the remote object from a remote location. This information can include, but is not limited to, the strong name of the class, the class hierarchy, the names of the interfaces the class implements, the object URI, and details of available channels that have been registered. The remoting framework uses the object URI to retrieve the object reference instance created for the remote object when it receives a request for that object. During unmarshaling, the object reference is parsed to extract method information associated with the remote object. The proxy and object reference classes are public and can be extended and customized when necessary.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

FIG. 1 illustrates a system 100 that facilitates providing open, extensive and sophisticated remoting services in a distributed object system. The system 100 includes a remote object monitor 110 and a remote object manipulator 120 that can be employed to monitor and/or manipulate a remote object 130 located on a server 140. The remote object 130 may be imaged by one or more proxies 150 that reside on one or more clients 160, and which may similarly interact with the remote object monitor 110 and/or the remote object manipulator 120.

The remote object monitor 110 may be, for example, a computer-related entity, either hardware, a combination of hardware and software, software, or software in execution. For example, the remote object monitor 110 may be, but is not limited to being, a process running on a processor, a processor, an object, an executable, a thread of execution, a program, and a computer. Similarly, the remote object manipulator 120 may be, for example, a computer-related entity, either hardware, a combination of hardware and software, software, or software in execution. For example, the remote object manipulator 120 may be, but is not limited to being, a process running on a processor, a processor, an object, an executable, a thread of execution, a program, and a computer.

The proxy 150 and the remote object 130 may exist in different application domains. An application domain (e.g., AppDomain) refers to a virtual process that serves to isolate an application. Objects created within the same application scope are typically created within the same application domain. A distributed object system facilitates communications across such application domains by means including remoting services.

The remote object monitor 110 and the remote object manipulator 120 facilitate providing more extensive, more open remoting services as compared to conventional systems. By way of illustration, in one example of the present invention, the remote object monitor 110 is operable to provide a human readable reference to the remote object 130. The human readable reference to a remote object may code information including, but not limited to, protocol information, protocol data, an application name and an object URI (Uniform Resource Identifier). In one example of the present invention, the human readable reference to a remote object is a URL (Uniform Resource Locator).

Since one of the objectives of a distributed object system is to provide an open, extensible framework for providing remoting services, the remote object monitor 110 and/or the remote object manipulator 120 can be employed to acquire metadata concerning a remote object 130. Furthermore, the remote object manipulator 120 can be employed to update metadata concerning a remote object 130. Such metadata can include, but is not limited to least one of information concerning interfaces implemented by the remote object, the type of the remote object, the class hierarchy of the remote object, methods implemented by the remote object, properties implemented by the remote object and attributes implemented by the remote object.

Conventionally, when a proxy 150 is created to image a remote object 130, internal constructor code associated with the proxy 150 may be executed. Similarly, when calls are made on a remote object 130, where the interception of such calls by the distributed operating system involved interacting with the proxy 150, internal code associated with the proxy 150 may have been executed. While executing such internal code provides a first set of functionality in a distributed object system, extending such functionality without changing the internal code of a class that implements the proxy 150 can provide benefits over conventional systems. Thus, a class that implements a proxy 150 may be "deco-rated" with "attributes", which are themselves objects. The attributes can contain information and/or code associated with the class that implements the proxy 150, but which is not considered internal to the class. The present invention, by providing entry points and process interception services provides, both at creation time and during runtime, the opportunity to perform attribute based code associated with a proxy 150. Such attribute based activation processing can be performed, for example, at times including but not limited to before, substantially in parallel with, and/or after non-attribute code associated with a remote object, providing extensibility advantages over conventional systems.

The remote object monitor 110 and/or the remote object manipulator 120 may further be employed to monitor and/or control the lifetime of a remote object 130. By way of illustration and not limitation, the remote object monitor 110 may employ a lease manager to monitor the lifetime of a remote object 130. Similarly, the remote object manipulator 120 may employ a lease manager to facilitate interacting with garbage collection services made available by a distributed object system, providing memory management improvements over conventional systems.

While the remote object monitor 110 and the remote object manipulator 120 are illustrated as separate entities in FIG. 1, it is to be appreciated that the remote object monitor 110 and the remote object manipulator 120 may be implemented in configurations including, but not limited to, within a single component, distributed between two or more communicating components, within a single thread and/or distributed between two or more cooperating threads.

Figure 2:
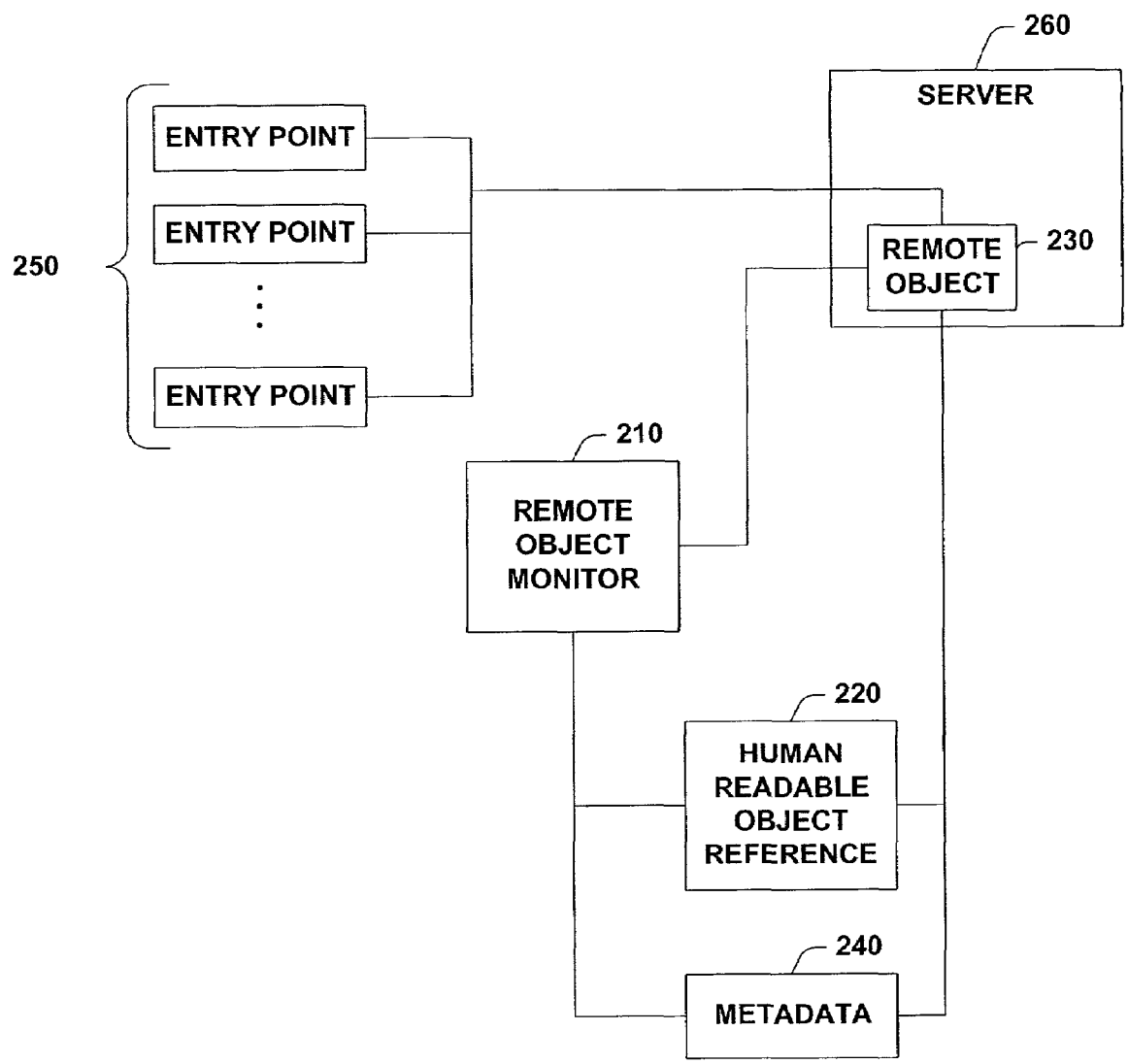
FIG. 2 is a schematic block diagram illustrating a remote object monitor that facilitates providing improved, open remoting services, in accordance with an aspect of the present invention.

Turning now to FIG. 2, one example remote object monitor 210 is illustrated. The remote object monitor 210 can provide a human readable object reference 220 to a remote object 230, can acquire and/or provide metadata 240 concerning the remote object 230, can provide one or more entry points 250 for custom attribute based activation processing and can monitor the lifetime of the remote object 230.

Concerning the human readable object reference 220, one example human readable object reference 220 may be http://www.gopal.com/401k/balance.htm. In this example human readable object reference 220, "http" encodes protocol information, "www.gopal.com" encodes protocol data, "401k" encodes an application name and "balance" encodes the object URI (Uniform Resource Identifier). Making the object reference 220 human readable facilitates understanding the object reference, and thus facilitates actions including, but not limited to, locating a remote object 230, debugging interactions concerned with a remote object 230 and/or a proxy, monitoring distributed object system activity and system management, which provides advantages over conventional systems that do not provide such human readable object references. By way of further example, the URL smtp:\\gopal@ms.com\401k\balance could also be a human readable object reference 220. In this example human readable object reference 220, "smtp" encodes protocol information, "gopal@ms.com" encodes protocol data, "401k" encodes an application name and "balance" encodes the object URI. While two human readable object references 220 are described above, it is to be appreciated that human readable object references in other formats, and with a greater and/or lesser number of coding portions may be employed in accordance with the present invention.

Another advantage of employing such human readable object references 220 is that such references facilitate a client acquiring a proxy to a remote object 230. By way of illustration, if a remote object 230 "balance" resides on a server 260, then a user at a client machine may acquire a proxy to the remote object 230 by entering the human readable object reference 220 into a browser. By way of further illustration, the user may also employ the human readable object reference 220 in client side code (e.g., to request a channel connection to the server object). Thus, the present invention facilitates acquiring proxies, which provides advantages over conventional systems.

Supplying a human readable object reference 220 also facilitates a user acquiring metadata 240 associated with a remote object 230. For example, given the URL http://www.gopal.com/401k/balance.htm a user may enter the URL into a browser and retrieve metadata concerning the object. Such metadata 240 can include, but is not limited to information concerning interfaces implemented by the remote object 230, the type of the remote object 230, the class hierarchy of the remote object 230, methods implemented by the remote object 230, properties implemented by the remote object 230 and attributes implemented by the remote object 230.

FIG. 2 also illustrates entry points 250 that can be employed by process interception services, both at creation time and during runtime, to facilitate performing attribute based code associated with a proxy that images a remote object 230. Such attribute based activation processing can be performed, for example, at times including but not limited to before, substantially in parallel with, and/or after non-attribute code associated with a remote object, providing extensibility advantages over conventional systems.

Figure 3:
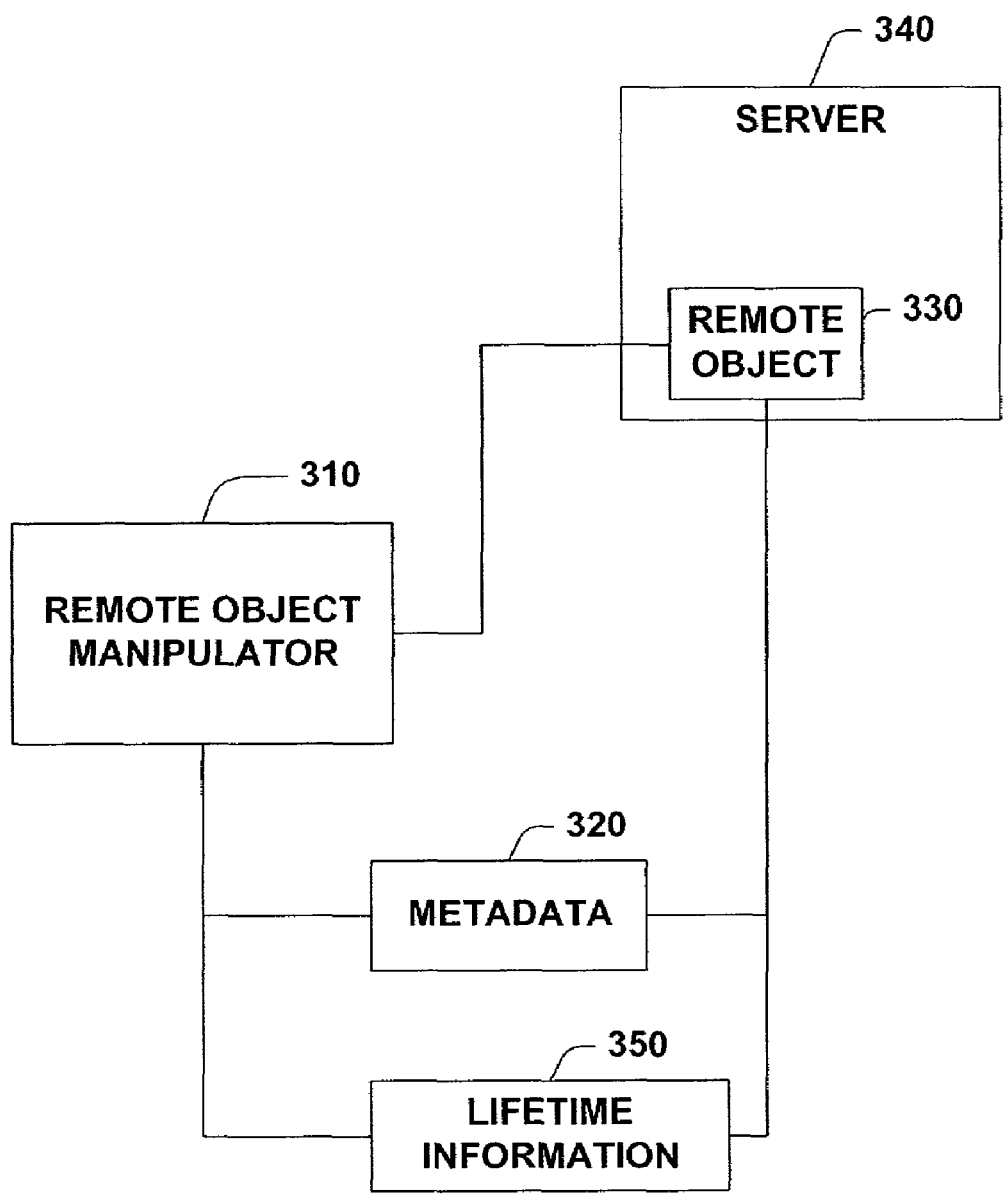
FIG. 3 is a schematic block diagram illustrating a remote object manipulator that facilitates providing improved, open remoting services in accordance with an aspect of the present invention.

FIG. 3 illustrates one example remote object manipulator 310, where the remote object manipulator 310 can update metadata 320 associated with a remote object 330 and where the remote object manipulator 310 can participate in controlling the lifetime of the remote object 330 by updating lifetime information 350, which facilitates interacting with garbage collection services provided by a distributed object system. The metadata 320 can include, but is not limited to information concerning interfaces implemented by the remote object 330, the type of the remote object 330, the class hierarchy of the remote object 330, methods implemented by the remote object 330, properties implemented by the remote object 330 and attributes implemented by the remote object 330. The lifetime information 350 can include, but is not limited to an initial lease time, a renew on access lease time, a lease sponsor and references to garbage collection objects and/or services.

The remote object manipulator 310 may employ a human readable object reference to locate, access and/or interact with the remote object 330. Furthermore, since the present invention facilitates inheriting from, overriding and/or extending an object reference base class, the remote object manipulator 310 may also employ such a derived object reference class to locate, access and/or interact with the remote object 330.

Figure 4:
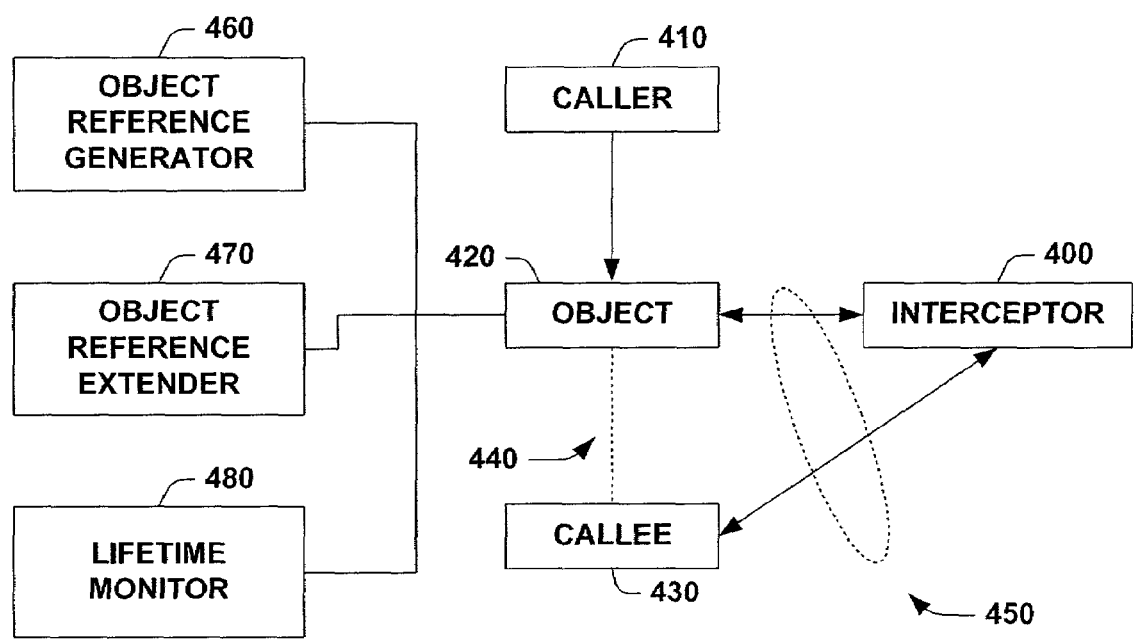
FIG. 4 is a schematic block diagram illustrating a remote method call interceptor that facilitates providing custom attribute based processing, in accordance with an aspect of the present invention.

FIG. 4 illustrates a remote method call interceptor 400 that facilitates providing custom attribute based processing. Conventionally, when a caller 410 made a remote method call that was associated with an object 420, the call was intended to be handled by a callee 430, with the call proceeding substantially directly along path 440 from the caller 410 to the callee 430. The present invention interacts with an interceptor 400 that facilitates rerouting the substantially direct path 440 through a more indirect path 450.

Being able to redirect the path of the call facilitates providing an opportunity for attribute based processing to be activated. Such attribute based processing may be associated with entities including, but not limited to, an object reference generator 460, an object reference extender 470 and a lifetime monitor 480. For example, the class that implements the object 420 may be decorated with one or more attributes. When a call is made from the caller 410 to the callee 430 on an instance of the class that implements the object 420, the interceptor 400 can provide an opportunity to perform actions including, but not limited to, scheduling for initiating, initiating, terminating and scheduling for terminating the performance of processing associated with the attributes that decorate the class that implements the object 420.

By way of illustration, when a remote method call involving the object 420 is made, the object reference generator 460 may examine the object reference associated with the object 420 and may manipulate that reference to, for example, make it more human-readable, to make it shorter, to embed state information in the reference, and the like. By way of further illustration, the object reference extender 470 may examine the object reference associated with the object 420 and instantiate a derived class object that derives from the object reference class employed in the call to facilitate providing capabilities not available via the original object reference class. By way of yet further illustration, the lifetime monitor 480 may examine the object reference associated with the object 420 and perform processing including, but not limited to, extending a lease on the object 420, signaling a lease sponsor associated with the object 420 and re-ordering one or more records associated with lease management. Such call activated attribute based processing may be performed at times including, but not limited to, before the execution of code internal to the object 420, substantially in parallel with code internal to the object 420 and after the execution of code internal to the object 420. The present invention, via the interceptor 400, facilitates such call activated attribute based processing and thus provides configuration, extension, and customization advantages over conventional systems.

Figure 5:
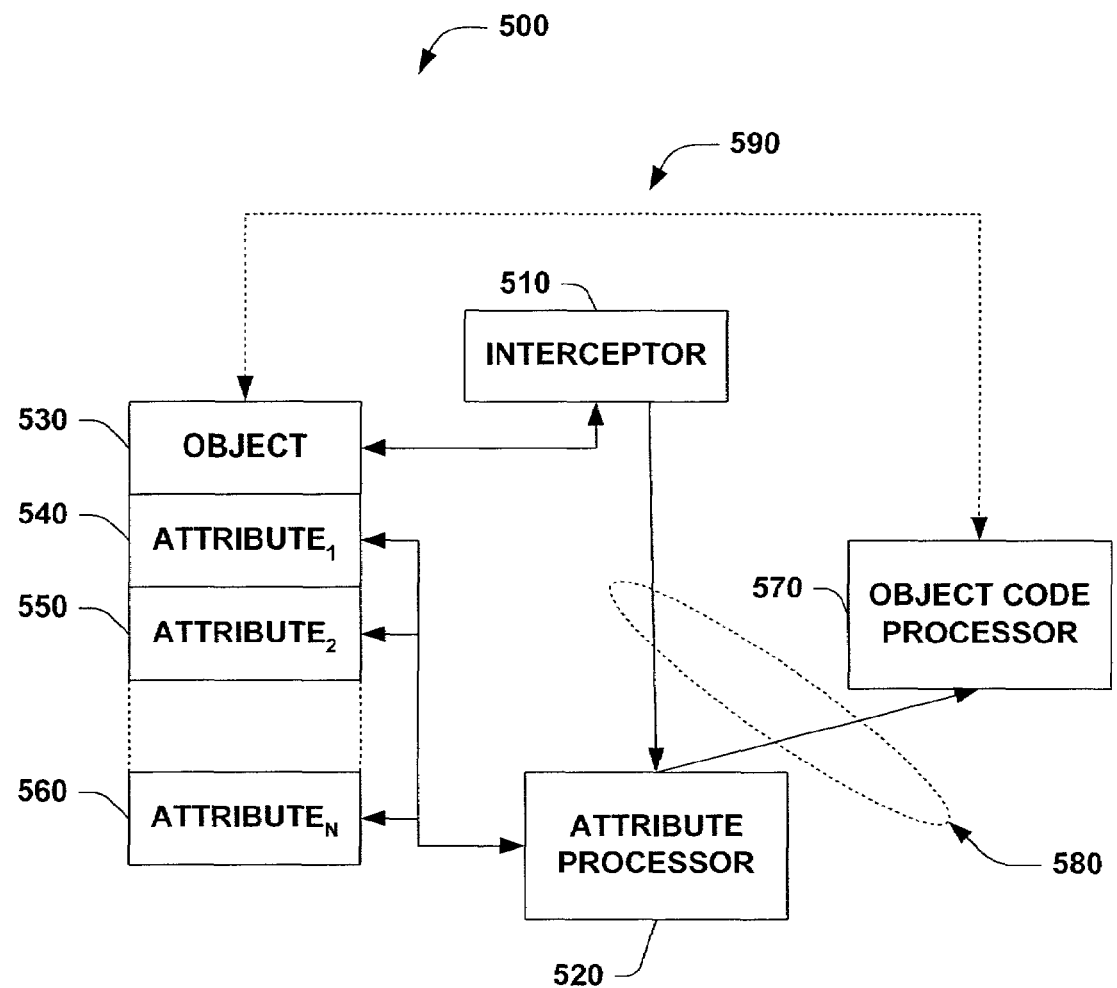
FIG. 5 is a schematic block diagram illustrating a remote method call interceptor that facilitates providing custom attribute based processing, in accordance with an aspect of the present invention.

FIG. 5 illustrates a system 500 that includes a remote method call interceptor 510 that facilitates providing attribute based processing. Conventionally, a remote method call from an object 530 to an object code processor 570 may follow the substantially direct path 590. But the remote method call interceptor 510 facilitates intercepting such a remote method call from an object 530 and provides the opportunity for the call to traverse the more indirect path 580, which includes processing by an attribute processor 520.

An object 530 may be decorated with one or more attributes (e.g., $ATTRIBUTE_1$ and $ATTRIBUTE_2$ 550 through $ATTRIBUTE_N$ 560, N being an integer). Such attributes are objects that can contain information and/or code associated with the object 530. When the remote method call interceptor 510 intercepts a remote method call, it can examine the object associated with the remote method call and determine whether there are attributes associated with the object. If there are such attributes, then the remote method call interceptor 510 may, for example, pass the beginning address of the attribute executable code to an attribute processor 520 and/or pass an object reference to the attribute. Thus, the attribute processor 520 can determine whether to execute the attribute code. While the remote method call interceptor 510, the attribute processor 520 and the object code processor 570 are illustrated in FIG. 5 as separate entities, it is to be appreciated that the remote method call interceptor 510, the attribute processor 520 and the object code processor 570 may be implemented in configurations including, but not limited to, within a single component, distributed between two or more communicating components, within a single thread and/or distributed between two or more cooperating threads.

Figure 6:
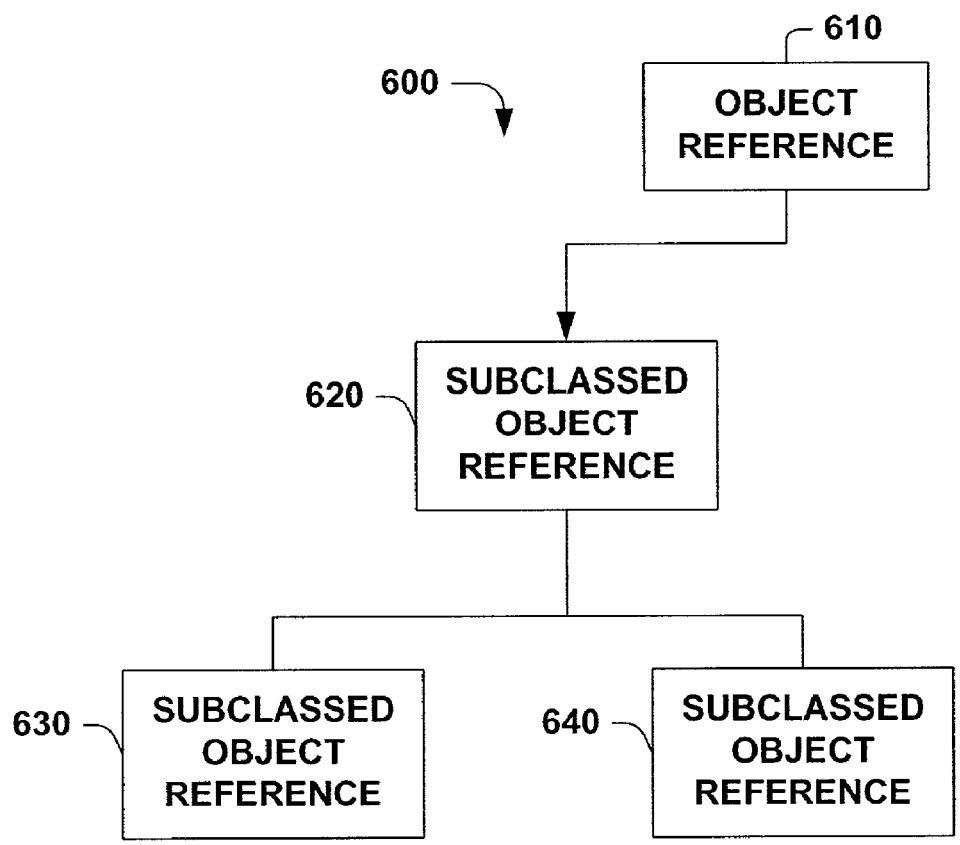
FIG. 6 is a schematic block diagram illustrating a sub-classable object reference, in accordance with an aspect of the present invention.

FIG. 6 is a schematic block diagram illustrating a class hierarchy 600 that includes a subclassable object reference base class 610. One problem with conventional distributed object systems concerns the inability of some objects to be remoted. Objects outside the application domain of the caller may be considered remote, even if the objects are executing on the same machine. Inside the application domain, objects are passed by reference while primitive data types are passed by value. Conventionally, local object references are valid inside the application domain in which they are created, but are not valid outside the application in which they are created, and thus cannot be passed across remoting boundaries (e.g., between application domains) in that form. Thus, local objects may be passed by value across a remoting boundary, may be marked with a custom attribute (e.g., [serializable]), and/or may implement a pre-defined interface (e.g., the ISerializable interface). When the object is passed as a parameter, the distributed object framework serializes the object and transports it to the destination application domain, where the object will be reconstructed. Conventionally, local objects that cannot be serialized cannot be passed to a different application domain and are therefore nonremotable. But the present invention facilitates changing objects to remote objects by having the object derive from an extensible object reference base class (e.g., the MarshalByRefObject class).

Thus, the present invention provides a class hierarchy 600 that includes an object reference base class 610. The object reference base class 610 may include a first set of interfaces, methods, properties, fields, events, attributes and the like. By having objects that will interact with a distributed object environment inherit from the object reference base class 610, problems with conventional systems are mitigated (e.g., more objects can be remoted). Thus, FIG. 6 illustrates a subclassed object reference class 620 that derives from the object reference base class 610. The subclassed object reference class 620 can perform actions including, but not limited to, employing the interfaces, methods, properties, fields, events and attributes of the object reference base class 610 as-is, overriding the interfaces, methods, properties, fields, events and attributes of the object reference base class 610 and adding additional interfaces, methods, properties, fields, events, attributes and the like to the subclassed object reference class 620.

The class hierarchy of classes that can derive from the object reference base class 610 is not limited to a one-deep hierarchy, and thus, further subclassed object reference classes, (e.g., subclassed object reference derived class 630, subclassed object reference derived class 640) are illustrated. While a two-deep class hierarchy is illustrated, it is to be appreciated that a greater or lesser degree of depth hierarchy may be employed in accordance with the present invention.

Figure 7:
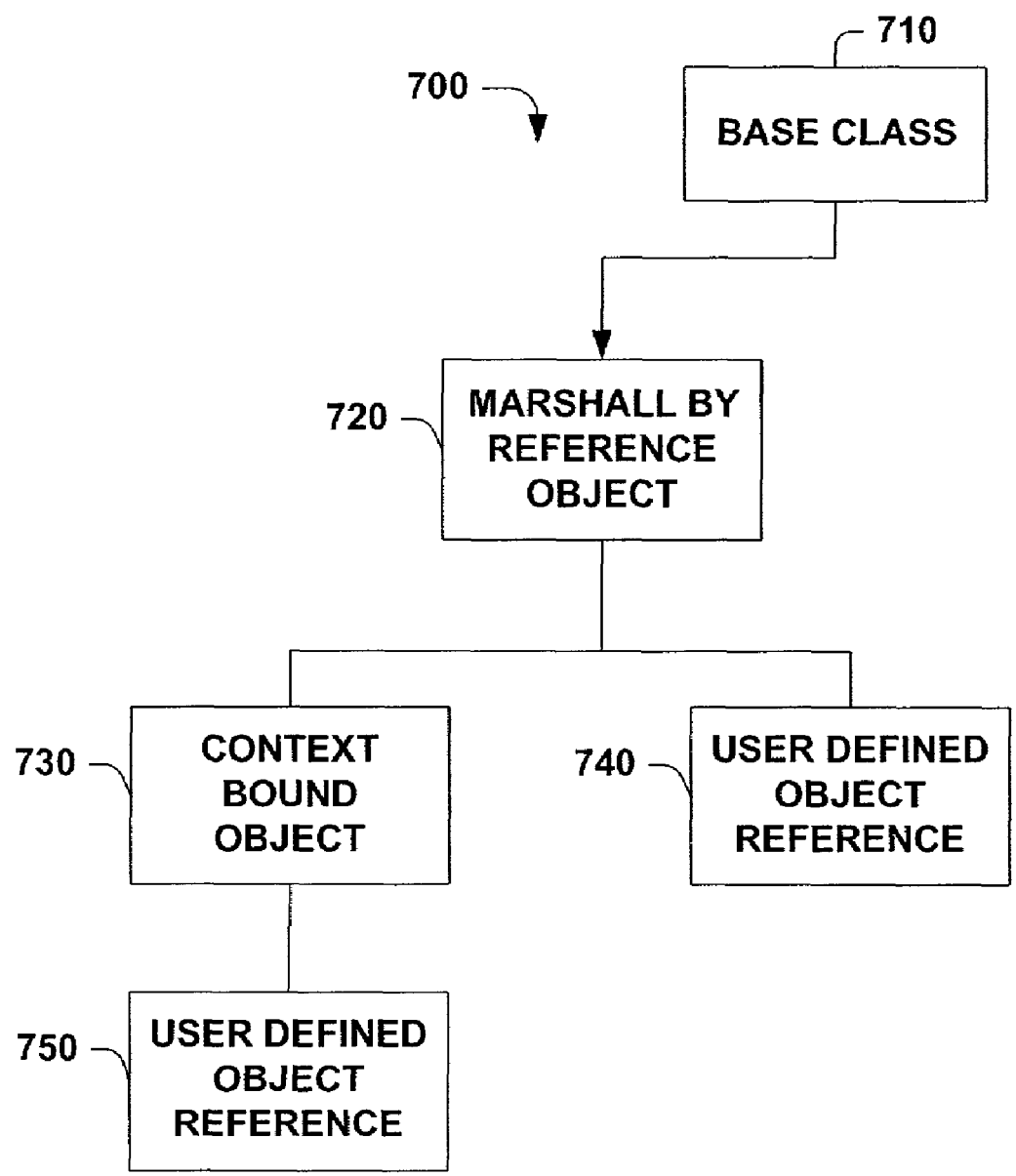
FIG. 7 is a schematic block diagram illustrating a sub-classable object reference in accordance with an aspect of the present invention.

Turning now to FIG. 7, one example class hierarchy 700 is illustrated. The class hierarchy 700 begins with a base class 710. The marshal-by-reference object reference class 720 inherits from the base class 710. Such system defined base classes (e.g., 710) are public and can be extended and customized when necessary. An object reference can be customized by providing replacements for the default object properties (e.g., type information, envoy information, channel information). The following code shows one example of customizing an object reference.

```
public class ObjRef
{
    public virtual IRemotingTypeInfo TypeInfo
    {
        get {return typeInfo;}
        set {typeInfo = value;}
    }
    public virtual IEnvoyInfo EnvoyInfo
    {
        get {return envoyInfo;}
        set {envoyInfo = value;}
    }
    public virtual IChannelInfo ChannelInfo
    {
        get {return channelInfo;}
        set {channelInfo = value; }
    }
}
```

One example derived object reference class is a context bound object reference class 730. A process may have several contexts. Calls between contexts can be intercepted via proxies and a distributed object system. Individual instances of objects may desire individualized actions to occur when the calls between contexts occur. Thus, objects that are decorated with attributes that desire such context bound behavior may employ the context bound object class 730 to facilitate providing the behavior that is not provided in the base class 710. Another example derived object reference class is a user defined object reference class 740. Such a user defined object reference class 740 may perform actions including, but not limited to, employing the interfaces, methods, properties, fields, events and attributes of the base class 710 as-is, overriding the interfaces, methods, properties, fields, events and attributes of the base class 710 and adding additional interfaces, methods, properties, fields, events, attributes and the like to the user defined object reference class 740. In addition to the user-defined object reference 740, a user-defined object reference 750 may inherit from a context bound object 730. Thus, the class hierarchy 700 facilitates additional openness in a distributed object system, which in turn facilitates additional flexibility and/or extensibility, providing advantages over conventional systems.

Figure 8:
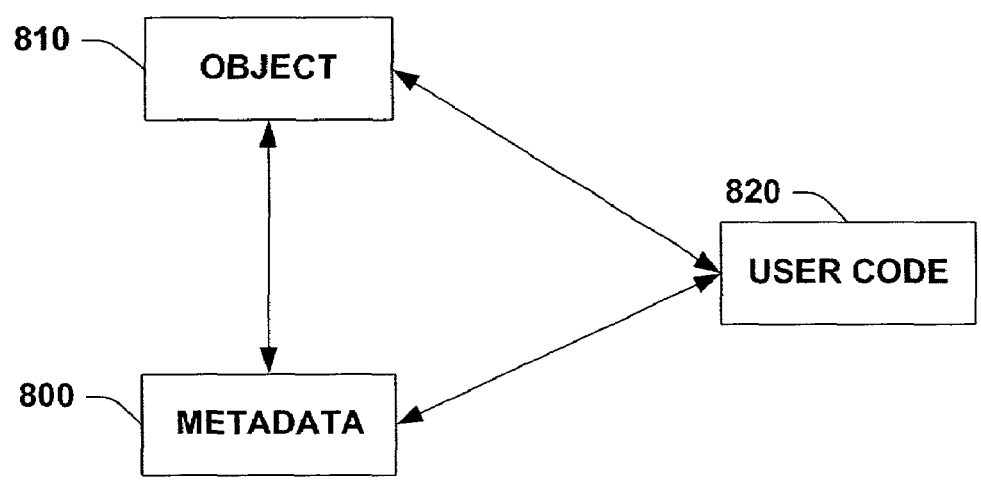
FIG. 8 is a schematic block diagram illustrating metadata being employed in accordance with an aspect of the present invention.

FIG. 8 illustrates metadata 800 associated with an object 810 being employed by user code 820. A compiler employed in connection with a distributed object system may embed metadata 800 into objects. For example, metadata employed in connection with one distributed object system that employs the present invention is a collection of information persisted in binary form in a Portable Executable (PE) file that is a specification of the items including, but not limited to, interfaces, methods, fields, events, attributes and properties implemented in the class. For example, the metadata 800 may contain a declaration for type and a declaration, including names and types, for members (methods, fields, properties, and events). For implemented methods, the metadata 800 contains information that a loader, for example, may employ to locate the method body. It is also possible for the creator of a class type to associate help text and comments with a method or parameter in the metadata 800. Thus, metadata helps developers produce code faster and more accurately. Some tools may retrieve metadata information using a technology called reflection. There is a set of classes for enumerating types as well as type members.

Metadata further facilitates implementing remote method calls in distributed object systems. To make a remote method call, a runtime will allocate a block of memory and lay the method's parameter data into it using a process called serialization. The runtime can employ the metadata to determine how large a memory block to allocate and how to marshal the parameter data into the block. The block of data may then be sent over a stream to the remote machine, where it is deserialized. Again, the metadata provides the template for the memory block.

Figure 9:
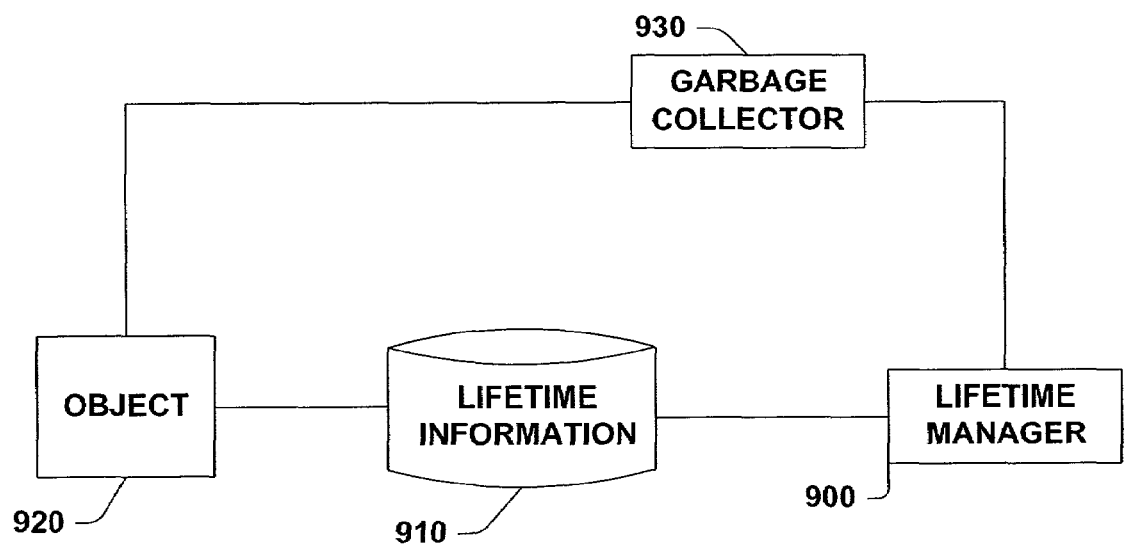
FIG. 9 is a schematic block diagram illustrating a lifetime manager employed to manage the lifetime of a remote object, in accordance with an aspect of the present invention.

FIG. 9 illustrates a lifetime manager 900 employed to manage the lifetime of a remote object 920. The lifetime manager 900 may interact with lifetime information 910 and/or a garbage collector 930, for example. Conventionally, remote objects may have produced problems like memory leaks (e.g., objects that outlive the entities that employ such objects). Furthermore, conventional attempts to alleviate memory leaks may produce unwanted side-effects (e.g., providing an avenue for denial of service attacks). Thus, the present invention facilitates managing the lifetime of a remote object 920 to mitigate memory leak problems and/or denial of service attacks.

The present invention provides a number of lifetime models from which a user may choose. These models fall into two categories: client-activated objects and server-activated objects. In one example of the present invention, client-activated objects are under the control of a lease-based lifetime manager 900 that facilitates the object 920 being garbage collected when its lease expires. Thus, the lifetime information 910 may hold data including, but not limited to, the holder of a lease, the initiator of a lease, the initial lease period for a lease, a renew on access value for a lease, an object reference to a garbage collector 930, an object reference to a lifetime manager 900 and sponsors of a lease. Such information can be stored in one or more standalone and/or co-operating distributed data structures including, but not limited to, lists, linked lists, arrays, records, tables, stacks, heaps, cubes and databases. While the lifetime information 910 is illustrated as a separate entity from the lifetime manager 900, it is to be appreciated that the lifetime information 910 may be stored in the lifetime manager 900 (e.g., as lifetime manager implementing object class local data).

Figure 10:
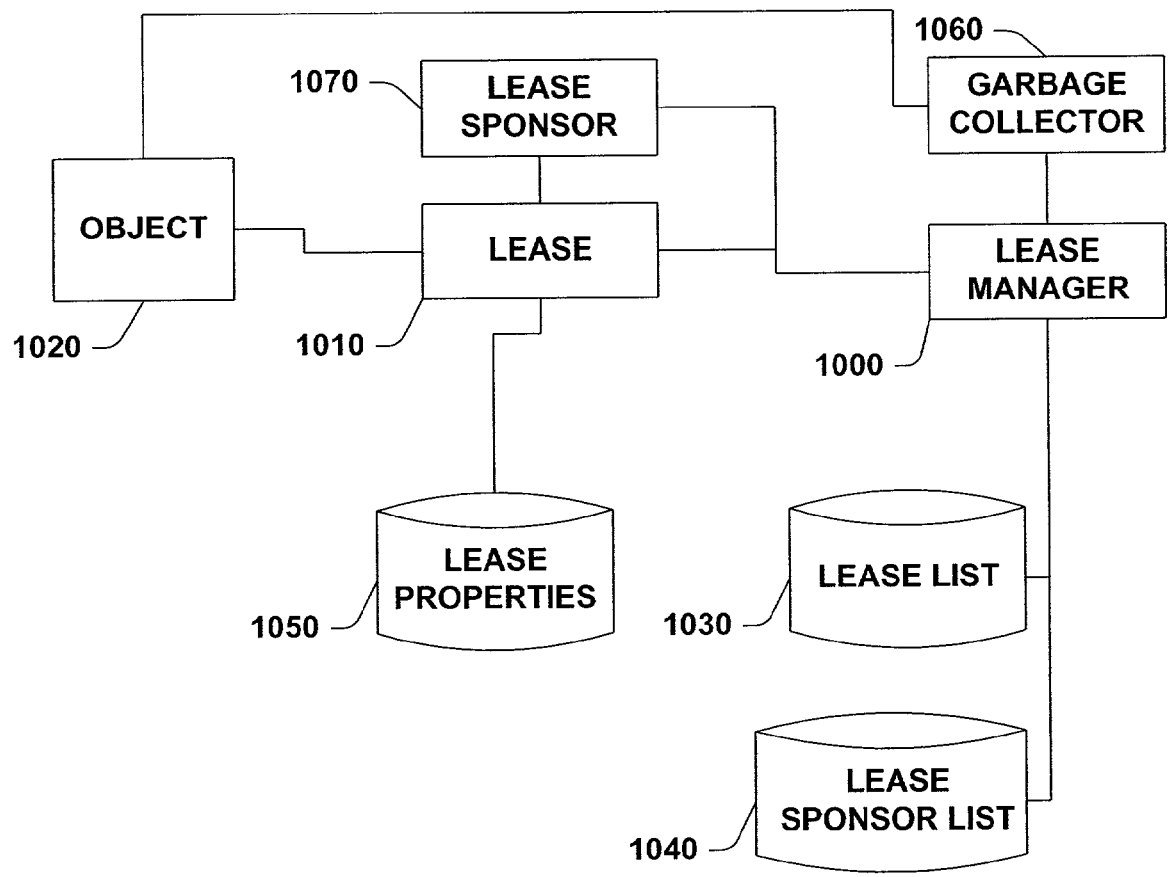
FIG. 10 is a schematic block diagram illustrating a lease manager employed to manage the lifetime of a remote object in accordance with an aspect of the present invention.

FIG. 10 illustrates a lease manager 1000 employed to manage the lifetime of a remote object 1020. Application domains may employ a lease manager 1000 that is responsible for administrating a lease 1010 in its domain. Types of leases 1010 include, but are not limited to, process wide (e.g., application domain wide) leases, leases for a particular type of object and/or leases for individual objects. In one example of the present invention, a lease 1010 may be examined periodically for an expired lease time. If a lease 1010 has expired, one or more lease sponsors 1070 may be queried and given the opportunity to renew the lease 1010. If the sponsors 1070 decide not to renew the lease 1010, then the lease manager 1000 can leave the lease 1010 expired and the object 1020 can be garbage collected by a garbage collector 1060. In one example of the present invention, the lease manager 1000 maintains a lease list 1030 with leases 1010 sorted by remaining lease time where the leases 1010 with the shortest remaining time are stored at the top of the lease list 1030.

Leases 1010 may implement an interface (e.g., ILease interface) and store in a lease properties data store 1050 a collection of properties that determine which policies and methods to renew. The lease properties data store 1050 can be implemented in data structures including, but not limited to, one or more standalone and/or co-operating distributed data structures including, but not limited to, lists, linked lists, arrays, records, tables, stacks, heaps, cubes and databases. Similarly, although a lease list 1030 is described in connection with FIG. 10, it is to be appreciated that information stored in the lease list 1030 may be stored in data structures including, but not limited to, lists, linked lists, arrays, records, tables, stacks, heaps, cubes and databases.

In one example of the present invention, the lease manager 1000 maintains a list 1040 of lease sponsors 1070. A lease sponsor 1070 is a component that has the opportunity to affect the running of the lease 1010 for the object 1020. For example, the lease sponsor 1070 may cause the lease period to be increased, decreased and/or maintained. In one example of the present invention, the lease manager 1000 maintains a lease sponsor list 1040, where the lease sponsors 1070 are stored in order of decreasing sponsorship time. When a lease sponsor 1070 is needed for renewing a lease time, one or more sponsors 1070 from the top of the lease sponsor list 1040 is asked to renew the lease time. The top of the list 1040 represents the sponsor 1070 that previously requested the largest lease renewal time.

The present invention further facilitates an object 1020 providing its own lease 1010 and thereby participating in controlling its own lifetime. Such customization is facilitated by the open, extensible object references described in connection with FIGS. 6 and 7. For example, an object 1020 may override a lifetime service initialization method (e.g., InitializeLifetimeService) method on a marshal by reference object. For example:

```
public class Foo : MarshalByRefObject {
    public override Object InitializeLifetimeService( )
    {
    ILease lease = (ILease)base.InitializeLifetimeService( );
    if(lease.CurrentState == LeaseState.Initial) {
        lease.InitialLeaseTime = TimeSpan.FromMinutes(1);
        lease.SponsorshipTimeout = TimeSpan.FromMinutes(2);
        lease.RenewOnCallTime = TimeSpan.FromSeconds(2);
        }
        return lease;
    }
}
```

In one example of the present invention, the lease properties 1050 can be changed when a lease 1010 is in its initial state. If the object 1020 has not previously been marshaled, the lease 1010 returned will be in its initial state and the lease properties 1050 can be set. Once the object 1020 has been marshaled, the lease 1010 transitions from the initial to the active state and attempts to initialize the lease properties 1050 may be ignored (e.g., an exception is thrown). A lease lifetime initialization method (e.g., InitializeLifetimeService) can be invoked when the remote object 1020 is activated to establish an initial lease time for the lease 1010. Furthermore, lease times may also be extended. For example, a client can invoke a renewing method on the lease class and the lease 1010 can request a renewal from a lease sponsor 1070. A lease 1010 can also be renewed on a call that involves the object 1020. By way of illustration, and not limitation, when a method is called on the remote object 1020, the lease time is set to the maximum of the current lease time plus the time renewal period time associated with a cal. When the lease time elapses, the lease sponsor 1070 is asked to renew the lease 1010. The lease sponsor 1070 may be unavailable (e.g., unreliable network), and to ensure that zombie objects are not left on a server, a lease 1010 may have a sponsorship timeout value that specifies the amount of time to wait for a lease sponsor 1070 to reply before the lease 1010 is terminated.

The lifetime services associated with the present invention thus provide advantages over conventional systems (e.g., reference counting systems) in that problems associated with memory leaks and/or denial of service attacks leading to zombie processes are mitigated.

Figure 11:
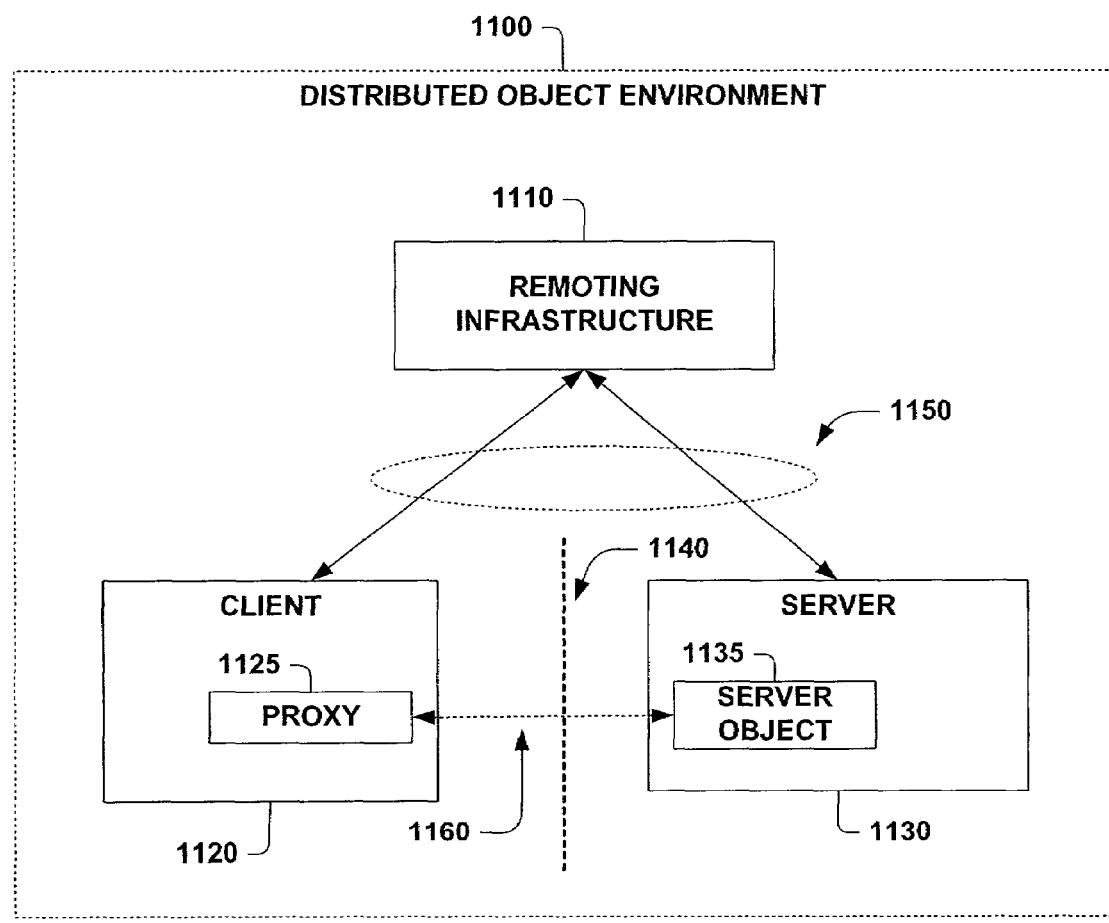
FIG. 11 is a schematic block diagram illustrating a remoting infrastructure being employed with object references, in accordance with an aspect of the present invention.

FIG. 11 illustrates a distributed object environment 1100 in which a remoting infrastructure 1110 is being employed to facilitate remote method calls between a client 1120 and a server 1130. Logically, a remote method call from a proxy 1125 to a server object 1135 traverses the path 1160, but physically the remote method call traverses a path 1150, via the remoting infrastructure 1110. Such remote method calls are facilitated by object references that contain information sufficient to locate and/or access a remote object from a remote location. As described in connection with FIGS. 6 and 7, object references as implemented in accordance with the present invention can contain information including, but not limited to, an object name, a class hierarchy, implemented interfaces, a URI, registered channels, and the like. In the present invention, such object references are human readable, subclassable and/or extensible so that users can create their own object references, and thus have access to both the more open, more extensive services provided by the distributed object environment 1100 and additional services provided by the user. One of the services provided through the present invention is the ability to pass by reference objects that conventionally were passed by value.

Figure 12:
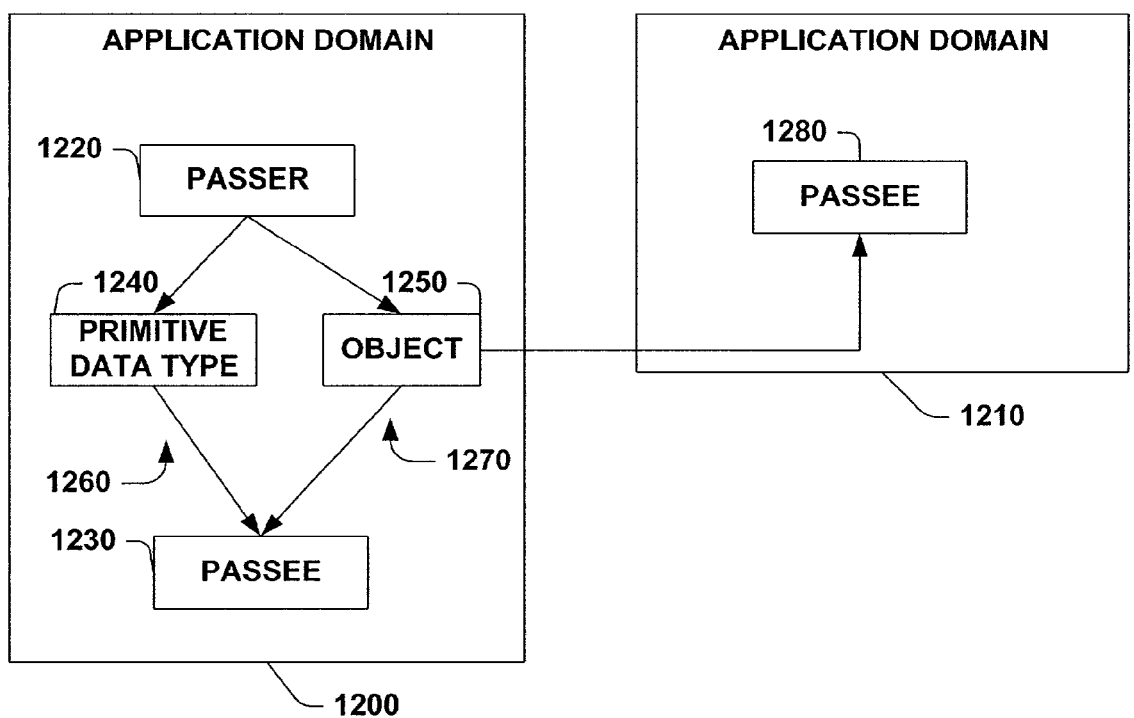
FIG. 12 is a schematic block diagram illustrating objects being passed by reference in association with object references, in accordance with an aspect of the present invention.

Thus, FIG. 12 illustrates an object 1250 being passed by reference via object references. Inside a first application domain 1200, an object 1250 may be passed from a passer 1200 to a passee 1230 by reference via call path 1270, while a primitive data type 1240 may be passed by value from the passer 1200 to the passee 1230 via call path 1260. Conventionally, local object references are valid inside the application domain in which they are created, but are not valid outside the application in which they are created, and thus cannot be passed across remoting boundaries (e.g., between application domain 1200 and application domain 1210) in that form. But the present invention, through open, extensible, subclassable object references, facilitates passing the object 1250 by reference between application domains, providing advantages over conventional systems that do not support such pass by reference. For example, deriving object reference classes from a base class object reference simplifies producing pluggable formatters that can be employed to (de)serialize an object.

Figure 13:
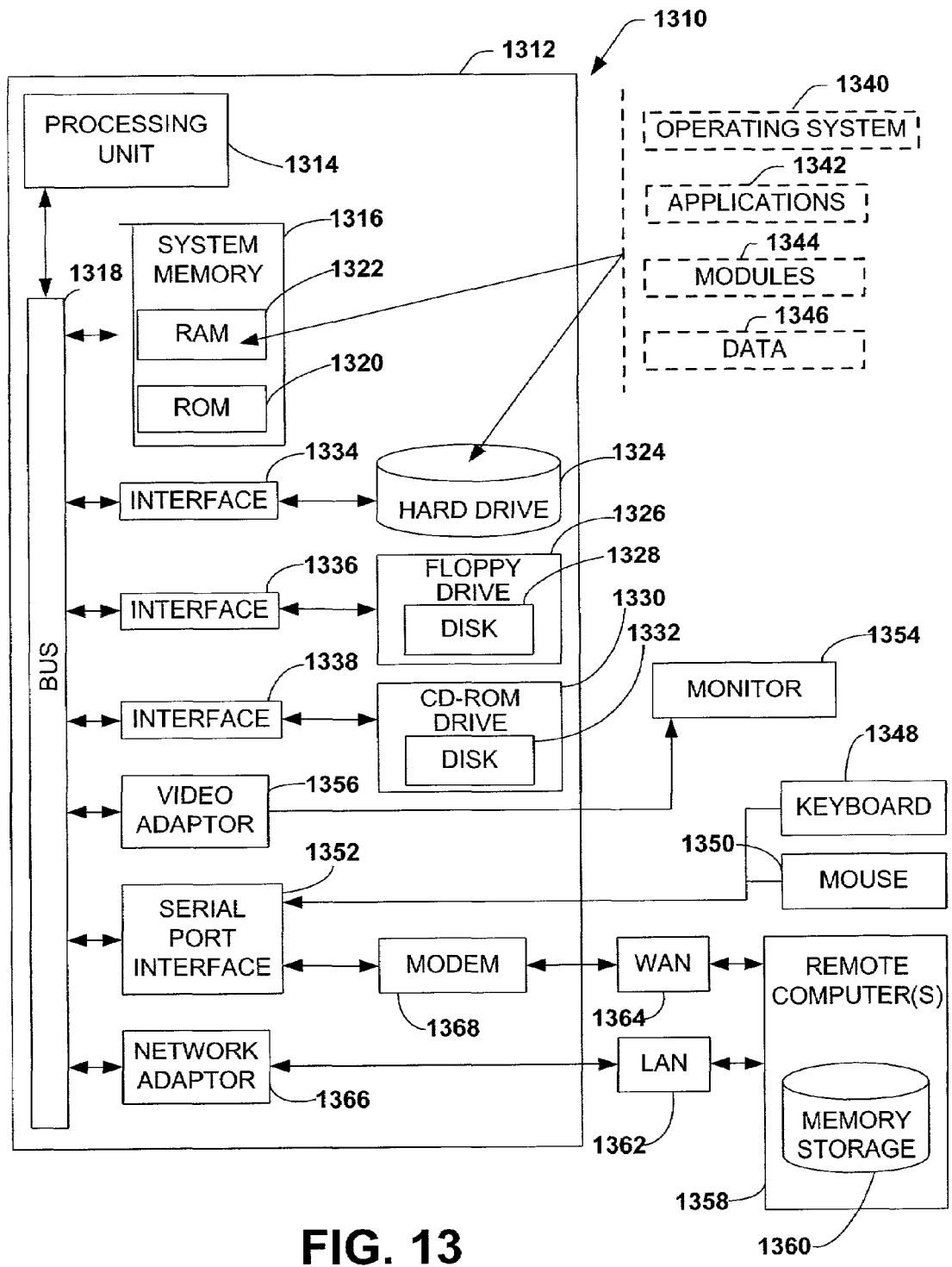
FIG. 13 is a schematic block diagram of an exemplary operating environment for a system configured in accordance with the present invention.

In order to provide additional context for various aspects of the present invention, FIG. 13 and the following discussion are intended to provide a brief, general description of one possible suitable computing environment 1310 in which the various aspects of the present invention may be implemented. It is to be appreciated that the computing environment 1310 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 13 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 13, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 14:
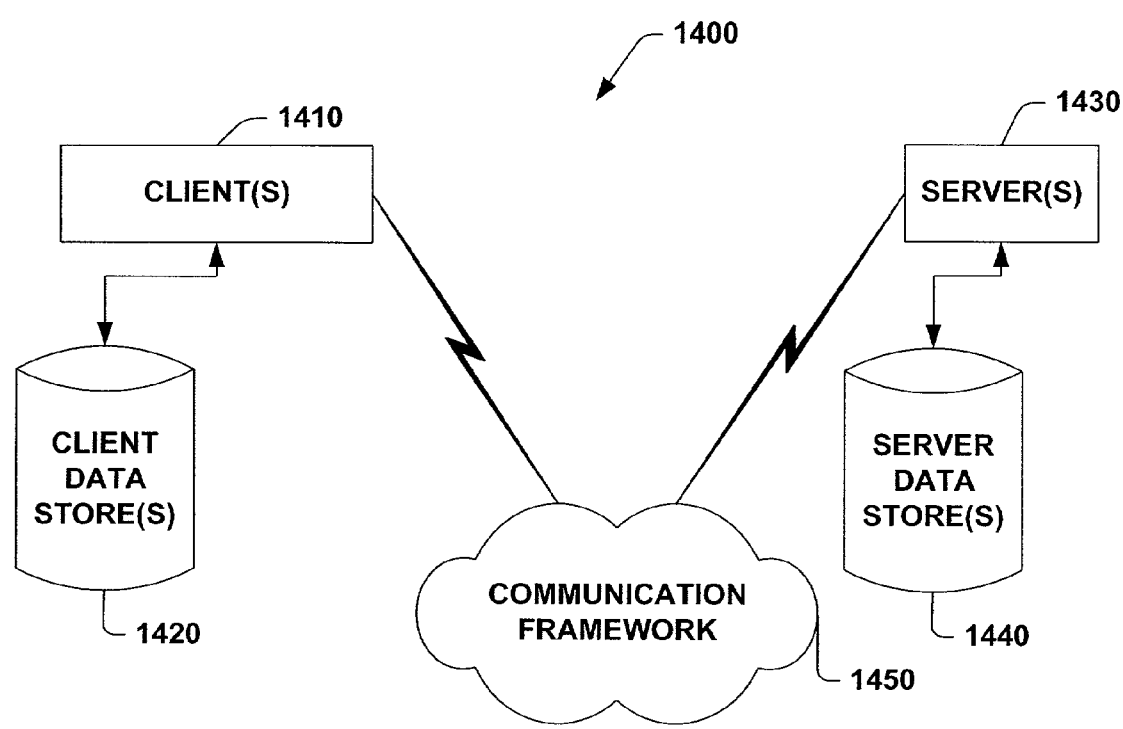
FIG. 14 is a schematic block diagram of an exemplary communication environment for a method performing in accordance with the present invention.

FIG. 14 is a schematic block diagram of a sample computing environment 1400 in which the present invention may operate. The system 1400 includes one or more clients 1410. The clients 1410 may be hardware and/or software (e.g., threads, processes, computing devices). The system 1400 also includes one or more servers 1430. The servers 1430 may also be hardware and/or software (e.g., threads, processes, computing devices). The clients 1410 may house one or more proxies that can be employed, in a distributed object environment, to image server objects housed on the servers 1430. Such proxies benefit from the advantages (e.g., human readable object references, subclassable object reference classes, metadata, lifetime management) provided by the present invention.

The system 1400 includes a communication framework 1450 that can be employed to facilitate communications between the clients 1410 and the servers 1430. The clients 1410 are operably connected to one or more client data stores 1415 that can be employed to store information local to the clients 1410 (e.g., class hierarchies, human readable object references). Similarly, the servers 1430 are operably connected to one or more server data stores 1440 that can be employed to store information local to the servers 1430 (e.g., class hierarchies, metadata).

Figure 15:
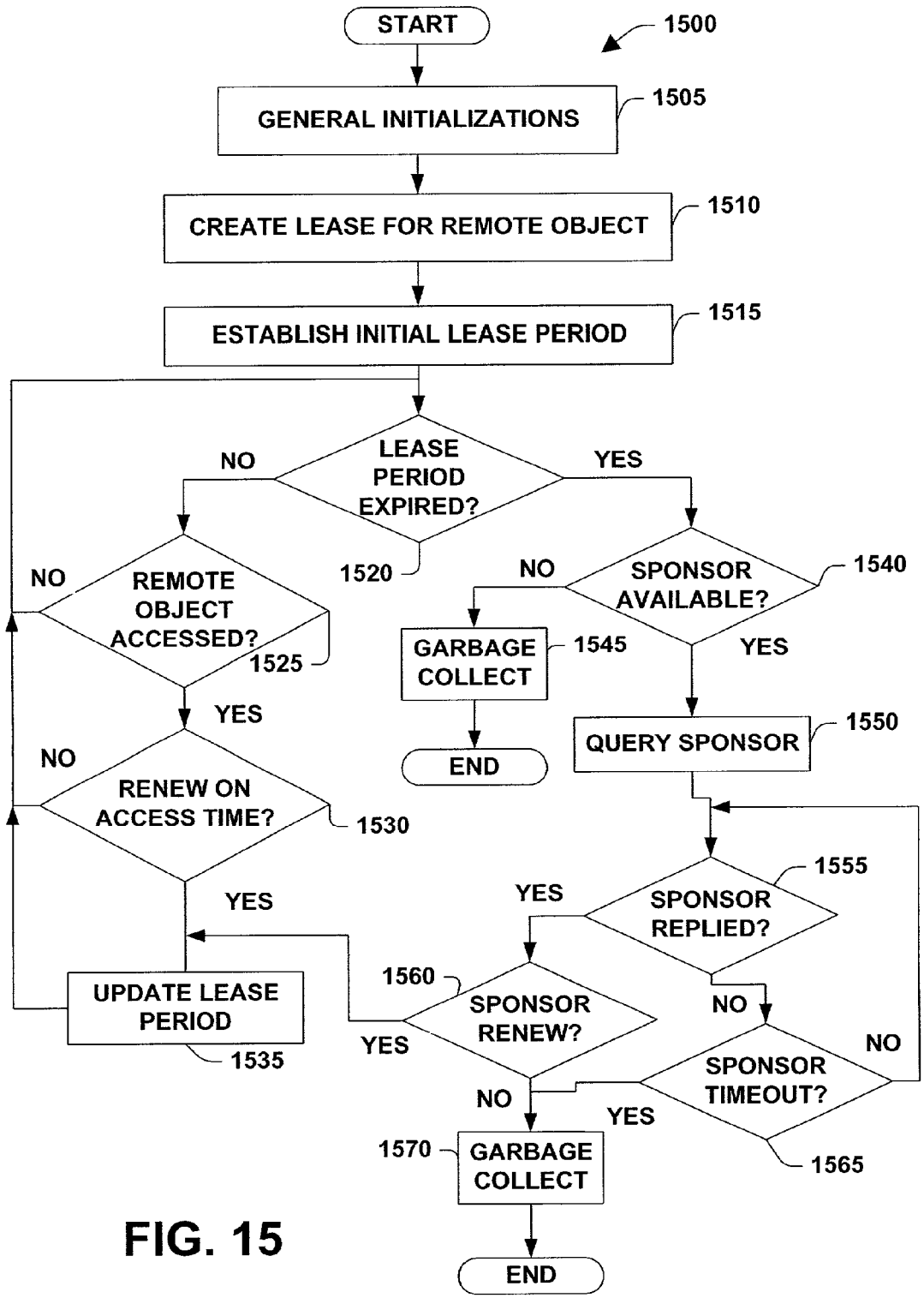
FIG. 15 is a flow chart illustrating a method for managing the lifetime of a remote object, in accordance with an aspect of the present invention.
Figure 16:
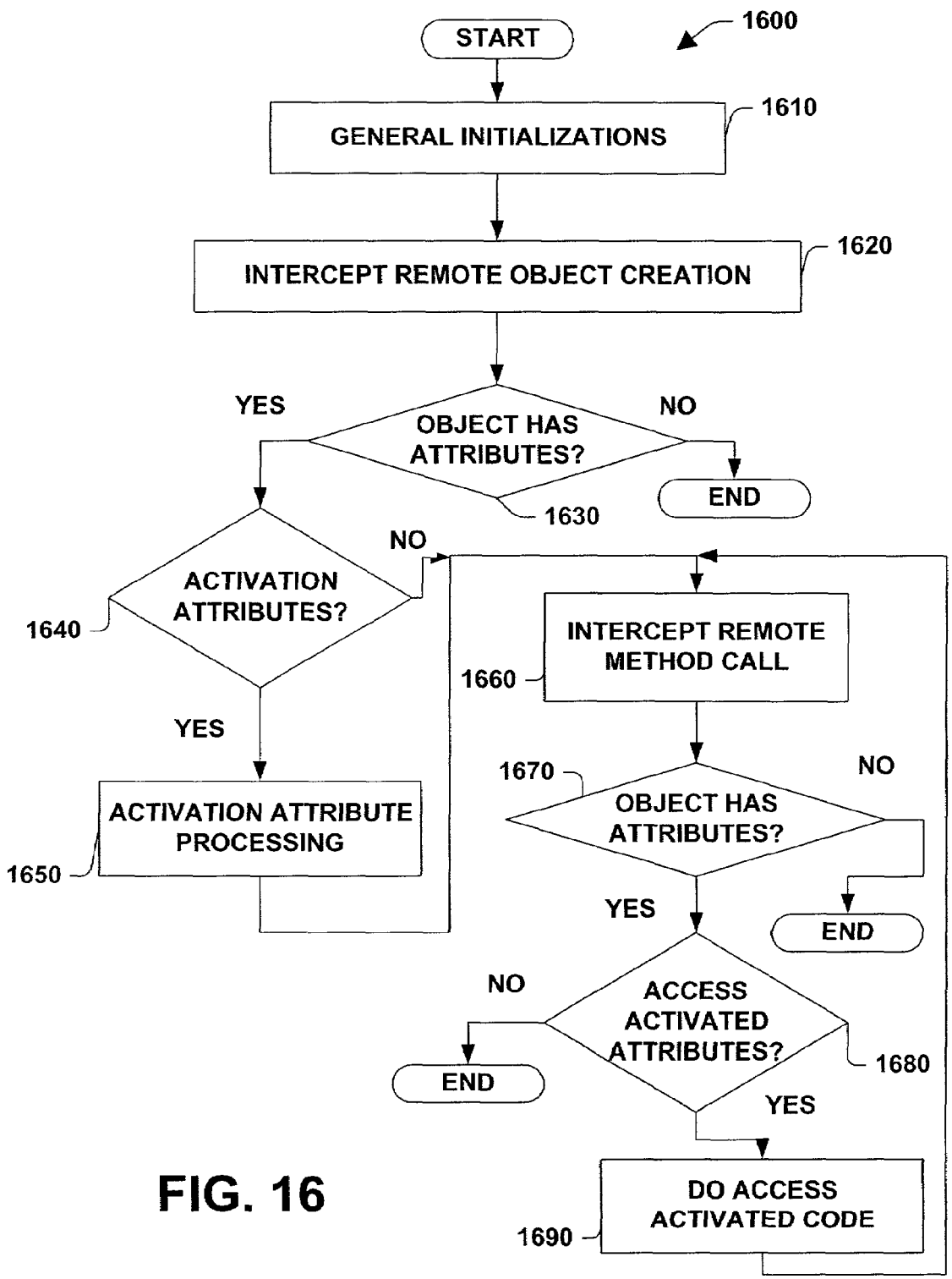
FIG. 16 is a flow chart illustrating a method for performing customized attribute based processing via interception, in accordance with an aspect of the present invention.
Figure 17:
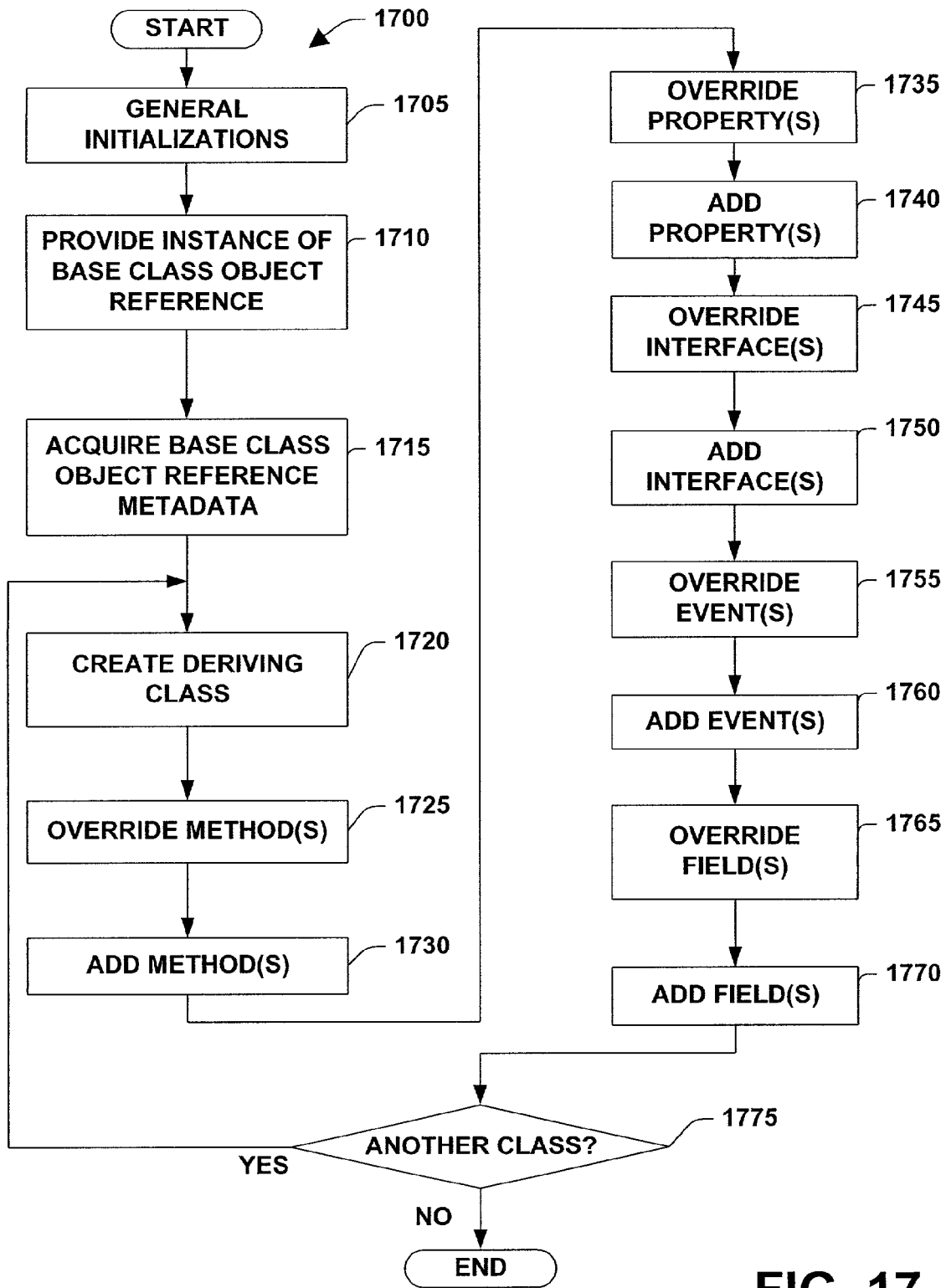
FIG. 17 is a flow chart illustrating a method for subclassing an object reference, in accordance with an aspect of the present invention.

In view of the exemplary systems shown and described above, methodologies that may be implemented in accordance with the present invention will be better appreciated with reference to the flow charts of FIGS. 15 through 17. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, computer executable instructions operable to perform the methods described herein may be stored on computer readable media.

FIG. 15 is a flow chart illustrating a method 1500 for managing the lifetime of a remoted object. At 1505, general initializations occur. Such initializations include, but are not limited to, allocating memory, establishing pointers, establishing data communications, acquiring resources, instantiating objects, finding a data structure that stores information identifying lease managers and/or sponsors and setting initial values for variables.

At 1510, a lease is created for a remoted object. The lease may be, for example, a process wide (e.g., application domain wide) lease, a lease for a particular type of object and/or a lease for an individual object. At 1515, an initial lease period is established. By way of illustration, the lease period may be for a period of ten seconds, with a renew on access time of five seconds. By way of further illustration, the lease period may be for a period of one hundred microseconds, with a renew on access time of one thousand microseconds. By way of still further illustration, the lease period may be for a period of forty eight hours with a renew on access time of zero hours. It is to be appreciated that different lease periods and different renew on access time periods may be employed in accordance with the present invention.

At 1520, a determination is made concerning whether the lease period for a lifetime managed remoted object has expired. If the determination at 1520 is NO, then at 1525 a determination is made concerning whether the remoted object was accessed. If the determination at 1525 is NO, then processing returns to 1520. If the determination at 1525 is YES, then at 1530 a determination is made concerning whether there is a valid renew on access time period available for the object. If the determination at 1530 is NO, then processing returns to 1520, otherwise, processing proceeds to 1535, where the lease period is updated according to the renew on access time period available for the object. In one example of the present invention, the lease period is controlled so that the outstanding lease period does not exceed a maximum lease period (e.g., two times the initial lease period).

If the determination at 1520 was YES, that the lease period for an object had expired, then at 1540 a determination is made concerning whether there is a lease sponsor. If the determination at 1540 is NO, then at 1545, the object can be garbage collected, thus mitigating memory leak problems associated with conventional systems. If the determination at 1540 is YES, that there is a lease sponsor, then at 1550 the lease sponsor can be queried concerning whether the lease sponsor wants the lease to be extended. By way of illustration, a lease sponsor may have information indicating that the object is going to be used in processing within a pre-determined period of time and that the cost of maintaining the object memory is less than the processing cost of reclaiming (e.g., garbage collecting) the object and then recreating the object at a later point. Thus, the lease sponsor may request that the lease period be extended. By way of further illustration, a lease sponsor may have information indicating that it is unlikely that an object is going to be employed within a pre-determined period of time and thus the lease sponsor may not request that the lease be extended. Since the lease sponsor may reside in a different space (e.g., application domain) and/or may be created and extinguished independently of the objects that it sponsors, it is possible that a lease sponsor may not respond to a lease extension query. Thus, at 1555, a determination is made whether the lease sponsor has replied. If the determination at 1555 is NO, then at 1565, a determination is made whether the sponsor query has been outstanding for too long a period of time. If the determination at 1565 is NO, then processing returns to 1555. But if the determination at 1565 is YES, then at 1570, the object can be garbage collected, mitigating problems associated with memory leaks and potential denial of service attacks.

If the determination at 1555 was YES, that the sponsor had replied, then at 1560 a determination is made concerning whether the sponsor wanted to renew the lease period. If the determination at 1560 is NO, then at 1570, the object can be garbage collected. But if the determination at 1560 is YES, then processing proceeds to 1535, where the lease period is updated.

FIG. 16 is a flow chart illustrating a method 1600 for performing customized attribute based processing via interception. At 1610, general initializations occur. Such initializations include, but are not limited to, allocating memory, establishing pointers, establishing data communications, acquiring resources, instantiating objects, finding a data structure that stores attribute identifying information and setting initial values for variables.

At 1620, a processing interception is made when a remote object is created. At 1630, during the processing associated with the processing interception of 1620, a determination is made concerning whether the object has attributes. If the determination at 1630 is NO, then the method 1600 concludes. If the determination at 1630 is YES, then at 1640, a determination is made concerning whether the object has activation attributes. Activation attributes may be associated with processing that is performed when an object is created (e.g., establishing state). If the determination at 1640 is YES, then at 1650, the attribute code associated with the activation attributes is executed. By way of illustration and not limitation, when a remote object is created, activation attribute code may perform processing including, but not limited to, registering the object, establishing data communications, incrementing one or more counters, establishing state and interacting with a lease manager. If the determination at 1640 is NO, then processing proceeds to 1660.

At 1660, a processing interception is made when a remote method call is made on a remote object. At 1670, a determination is made concerning whether the object has attributes. If the determination at 1670 is NO, then the method 1600 concludes. But if the determination at 1670 is YES, then at 1680, a determination is made concerning whether the object has access activated attributes. If the determination at 1680 is NO, then the method 1600 concludes. If the determination at 1680 is YES, then at 1690, the attribute code associated with the access activated attributes is performed. By way of illustration, code associated with the access activated attributes may perform actions including, but not limited to, interacting with a lease manager to facilitate updating a lease, incrementing one or more access counters, interacting with a transaction log (e.g., to facilitate transaction rollback) and interacting with a performance monitor (e.g., to facilitate system monitoring, debugging and management). After 1690, processing returns to 1660. While separate processing is illustrated concerning attributes (e.g., activation attributes, access activated attributes), it is to be appreciated that various types of attributes may be identified at one point in time and then processing associated with such attributes performed at various other points in time.

FIG. 17 is a flow chart illustrating a method 1700 for subclassing the open, extensible object references provided by the present invention. At 1705, general initializations occur. Such initializations include, but are not limited to, allocating memory, establishing pointers, establishing data communications, acquiring resources, instantiating objects and setting initial values for variables.

At 1710, an instance of the base class object reference is provided. Employing the instance of 1710, at 1715, base class object reference metadata can be acquired. For example, information including, but not limited to, the class hierarchy associated with the base class object reference, interfaces implemented by the base class object reference, methods implemented by the base class object reference, properties implemented by the base class object reference, attributes implemented by the base class object reference and events implemented by the base class object reference can be acquired. At 1720, employing the instance of the base class object and the metadata acquired at 1715, a deriving class can be created and then, at 1725 through 1770 the deriving class can be customized. By way of illustration, and not limitation, at 1725, one or more methods implemented in the base class object reference can be overridden and at 1730 one or more methods may be added to the deriving class of 1720. Similarly, at 1735, one or more properties implemented in the base class object reference can be overridden and at 1740 one or more properties may be added to the deriving class of 1720. At 1745, one or more interfaces implemented in the base class object reference can be overridden and at 1750 one or more interfaces may be added to the deriving class of 1720, while at 1755, one or more events implemented in the base class object reference can be overridden and at 1760 one or more events may be added to the deriving class of 1720 and at 1765, one or more fields implemented in the base class object reference can be overridden and at 1770 one or more fields may be added to the deriving class of 1720. Thus, by overriding and/or adding entities including, but not limited to, methods, properties, interfaces, events and fields, a user designed custom object reference can be derived from an open base class object reference, providing advantages over conventional closed systems. At 1775, a determination is made concerning whether the user desires to derive an additional class, and if the determination at 1775 is YES, then processing returns to 1720, otherwise processing concludes.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system that facilitates remoting services across application domains in a distributed object system, the system comprising:

a remote object monitor to monitor a remote object, the remote object imaged as a proxy object existing in a different application domain, a class that implements the proxy object being extensible through one or more attributes to provide attribute based code, wherein the remote object monitor is configured to monitor the remote object at least by intercepting client calls on the remote object, perform the attribute based code; and determine a lifetime of the remote object, the remote object monitor to employ a lease to determine the lifetime of the remote object.

2. The system of claim 1, where the client calls on the remote object comprise a human readable reference to the remote object.

3. The system of claim 2, where the human readable reference to the remote object codes information comprising at least one of protocol information, protocol data, an application name and an object URI (Uniform Resource Identifier).

4. The system of claim 3, where the human readable reference to the remote object is a URL (Uniform Resource Locator).

5. The system of claim 3, where the protocol information is at least one of HTTP (Hypertext Transfer Protocol) information and SMTP (Simple Mail Transfer Protocol) information.

6. The system of claim 1, where the attribute based code is to be performed before non-attribute code associated with the proxy object.

7. The system of claim 1, where the attribute based code is to be performed in parallel with non-attribute code associated with the proxy object.

8. The system of claim 1, where the attribute based code is to be performed after non-attribute code associated with the proxy object.

9. The system of claim 1, where the attribute based code is to be performed at least one of before, in parallel with, and/or after non-attribute code associated with the proxy object.

10. The system of claim 1, where the lease further comprises a renew on access time.

11. A computer readable storage medium storing computer executable components to facilitate extending the class that implements the proxy object of the system of claim 1.

* * * * *